(12) United States Patent
Bidell et al.

(10) Patent No.: US 6,593,442 B2
(45) Date of Patent: Jul. 15, 2003

(54) SEMICRYSTALLINE PROPYLENE POLYMER COMPOSITIONS WITH GOOD SUITABILITY FOR PRODUCING BIAXIALLY ORIENTED FILMS

(75) Inventors: Wolfgang Bidell, Mutterstadt (DE); Roland Hingmann, Sant Just Desvern (ES); Franz Langhauser, Rupperstberg (DE); Dieter Lilge, Limburgerhof (DE); Volker Rauschenberger, Eisenberg (DE); Günther Schweier, Friedelsheim (DE); Florian Stricker, Heidelberg (DE); Jürgen Suhm, Ludwigshafen (DE)

(73) Assignee: Basell Polypropylen GmbH (DE)

( * ) Notice: Subject to any disclaimer, the term of this patent is extended or adjusted under 35 U.S.C. 154(b) by 7 days.

(21) Appl. No.: 09/737,848

(22) Filed: Dec. 18, 2000

(65) Prior Publication Data

US 2001/0004662 A1 Jun. 21, 2001

(30) Foreign Application Priority Data

Dec. 21, 1999 (DE) .......................... 199 62 130

(51) Int. Cl.⁷ .......................... C08F 10/06; C08F 210/06
(52) U.S. Cl. ...................... 526/348.1; 526/65; 526/113; 526/114; 526/115; 526/116; 526/117; 526/118; 526/119; 526/348; 526/351; 526/905; 525/191; 525/240; 525/53; 428/910; 264/435; 264/901
(58) Field of Search .......................... 525/240, 191; 526/348, 348.1, 351, 65, 113, 114, 115, 116, 117, 118, 119, 905; 428/910; 264/435, 901

(56) References Cited

U.S. PATENT DOCUMENTS

| 4,668,753 A | 5/1987 | Kashiwa et al. ............. 526/348 |
| 4,950,720 A | 8/1990 | Randall, Jr. et al. ......... 525/322 |
| 6,103,841 A | 8/2000 | Ebara et al. ................. 526/125 |
| 2001/0012874 A1 * | 8/2001 | Huffer et al. ................ 525/191 |

FOREIGN PATENT DOCUMENTS

| EP | 0 444 671 | 9/1991 |
| EP | 0 887 357 | 12/1998 |
| EP | 887 357 A1 * | 12/1998 |
| JP | A H10 053 675 | 2/1998 |
| WO | WO 96/20225 | 7/1996 |
| WO | WO 98/56580 | 12/1998 |
| WO | WO 98/59002 | 12/1998 |

* cited by examiner

*Primary Examiner*—David W. Wu
*Assistant Examiner*—R. Rabago
(74) *Attorney, Agent, or Firm*—Keil & Weinkauf

(57) ABSTRACT

A semicrystalline propylene polymer composition with good suitability for producing biaxially oriented films and prepared by polymerizing propylene, ethylene and/or $C_4$–$C_{18}$-1-alkenes, where at least 50 mol % of the monomer units present arise from the polymerization of propylene. Also described is the use of the semicrystalline propylene polymer composition for producing films, fibers or moldings, the films, fibers and moldings made from these compositions, biaxially stretched films made from the semicrystalline propylene polymer compositions, and also a method for characterizing the semicrystalline propylene polymer compositions.

9 Claims, 1 Drawing Sheet

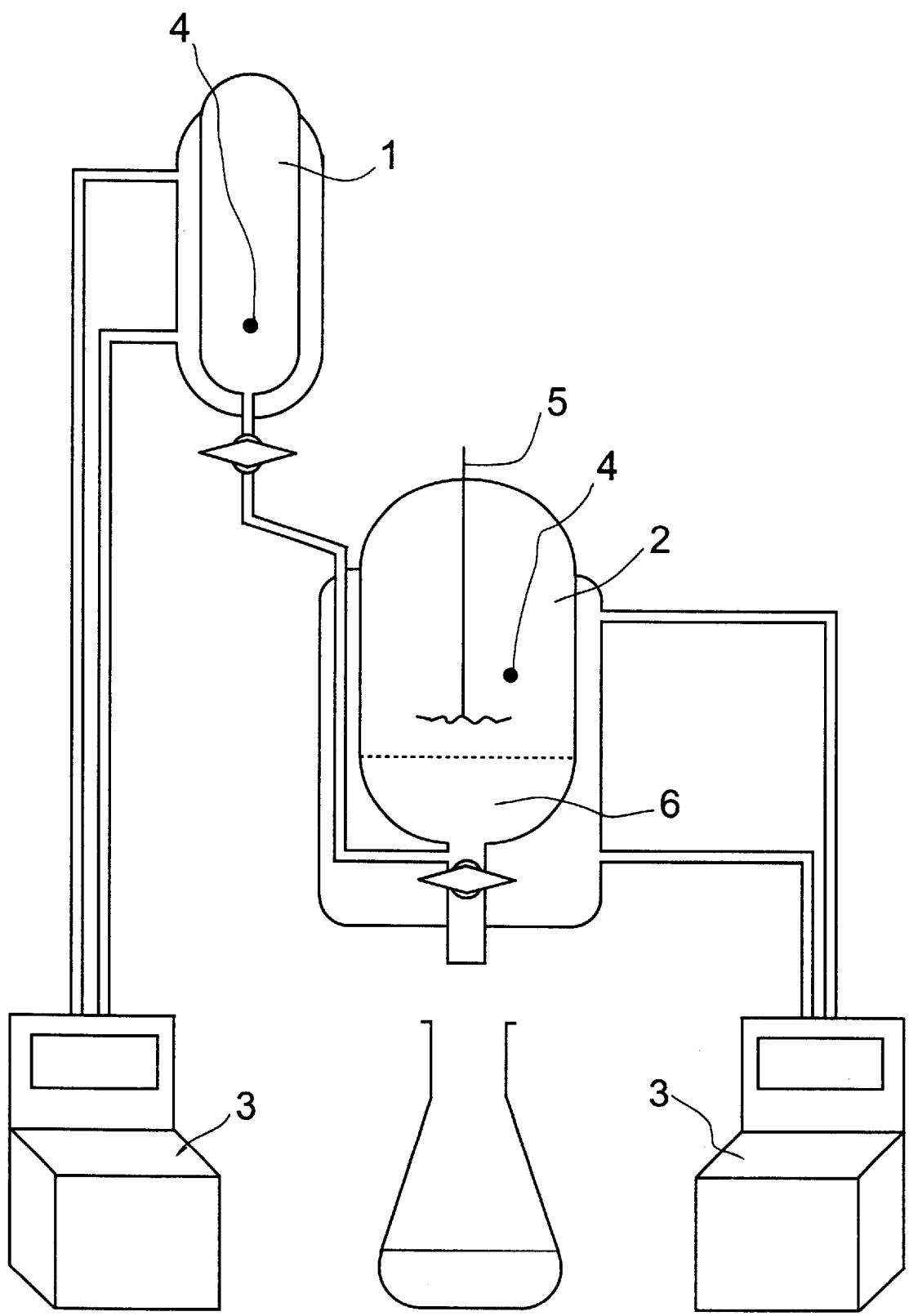

SEMICRYSTALLINE PROPYLENE POLYMER COMPOSITIONS WITH GOOD SUITABILITY FOR PRODUCING BIAXIALLY ORIENTED FILMS

The present invention relates to semicrystalline propylene polymer compositions which are particularly suitable for producing biaxially oriented films. The invention further relates to the use of the semicrystalline propylene polymer compositions for producing films, fibers or moldings, and also to the films, fibers and moldings made from these compositions.

The term polypropylene is generally understood to denote a wide variety of different polymers, a common feature of which is that they have been built up to a substantial extent from the monomer propylene. The various polypropylenes are generally obtained by coordinative polymerization on catalysts made from transition metals, which give predominantly ordered incorporation of the monomers into a growing polymer chain.

The polymer chains obtained during the polymerization of propylene with the usual coordination catalysts have a methyl side group on each second carbon atom. The polymerization therefore proceeds in a regioselective manner. Depending on the orientation of the monomers during incorporation into the chain, various stereochemical configurations are obtained. If the monomers all have the same arrangement when they are incorporated, the methyl side groups in the polymer chain are then all on the same side of the principal chain. The term used is isotactic polypropylene. If all of the monomers alternate in their spatial orientation when incorporated into the chain, the resultant polypropylene is termed syndiotactic. Both of these varieties with their stereoregular structures are semicrystalline and therefore have a melting point.

However, since the incorporation of the propylene monomers when coordination catalysts are used is not absolutely consistent, but some of the monomers are introduced in a way which differs from that of the majority, the polymer chains formed always have "defects" in the prevailing arrangement, and the number of these defects can vary considerably.

The longer the defect-free structure sequences in the polymer chains, the more readily the chains crystallize and therefore the higher are the crystallinity and the melting point of the polypropylene.

If the methyl side groups have an irregular stereochemical arrangement the polypropylenes are termed atactic. These are completely amorphous and therefore have no melting point.

The industrial preparation of polypropylene nowadays mostly uses heterogeneous catalysts based on titanium, and the resultant product is a predominantly isotactic polymer. These catalysts, for which the term Ziegler-Natta catalysts has become established, have a number of different centers active for polymerization. These centers differ both in their stereospecificity, i.e. in the number of "defects" which the resultant chains have, and also in the average molar mass of the chains formed. The predominant defects observed in all cases are stereo-defects, meaning that individual propylene monomers were incorporated syndiospecifically instead of isospecifically. The result of polymerization with heterogeneous catalysts of this type is therefore a mixture of various polymer chains which differ both in their stereochemistry and in their molar mass.

A substantial application sector for polypropylenes is that of films, particularly biaxially stretched films, frequently also termed BOPP (biaxially oriented polypropylene) films.

A general aim of almost all developments in the polypropylenes sector is to reduce the soluble fractions of the polymers used. This is frequently possible via the use of optimized conventional Ziegler-Natta catalysts. The result is firstly an improvement in organoleptic properties, advantageous for applications in the medical and food sectors, and secondly a favorable effect on mechanical properties, in particular stiffness. However, polypropylenes of this type with reduced soluble fractions cannot be used for producing biaxially stretched polypropylene films, since they have low capability, or no capability, for processing to give these films. Many efforts have therefore been made to use variations in the composition in order to find polypropylenes suitable for producing biaxially stretched polypropylene films.

EP-A 339 804 describes a mixture of a homopolypropylene and a random propylene copolymer, where the comonomer has been incorporated within the upper range of the molecular-weight distribution of the mixture. Mixtures of this type have good optical and mechanical properties, but have limited processability.

EP-A 115 940 discloses propylene-ethylene copolymers suitable for producing biaxially stretched films and having from 0.1 to 2.0 mol % of ethylene and high isotacticity. These polymers have good extensibility, stiffness, transparency, impact strength and stability in relation to heat-shrinkage. However, they frequently do not meet the requirements of BOPP film producers with respect to mechanical, rheological and optical properties.

EP-A 657 476 describes an α-olefin polymer obtained by polymerizing an a-olefin having 3 or more carbon atoms and whose composition has been defined via the proportions by weight of fractions soluble in xylene at 20° C. and insoluble in xylene at 105° C.

JP-A 10 053 675 describes a polypropylene composition composed of a high-molecular-weight crystalline polypropylene with a soluble fraction of less than 5% and a low-molecular-weight polyolefin composition with a soluble fraction of more than 30%.

Although the propylene polymer compositions known from the prior art permit the production of biaxially oriented polypropylene films, they do not combine this property with ideal processibility and very good mechanical properties of the films. This means that it has hitherto not been possible to decouple the inverse correlation between processibility and mechanical properties of the films.

It is an object of the present invention, therefore, to develop propylene polymer compositions which have excellent processibility to give biaxially stretched films and from which, at the same time, films with very good mechanical and optical properties can be produced. It should also be possible to obtain these by a very uncomplicated process, and the films should have good barrier action, for example with respect to oxygen and water vapor.

We have found that this object is achieved by a semicrystalline propylene polymer composition with good suitability for producing biaxially oriented films and prepared by polymerizing propylene, ethylene and/or $C_4$–$C_{18}$-1-alkenes, where at least 50 mol % of the monomer units present arise from the polymerization of propylene, and with a melting point $T_M$ of from 65 to 170° C., where the melting point $T_M$ is determined by differential scanning calorimetry (DSC) to ISO 3146 by heating a previously melted specimen at a heating rate of 20° C./min, and is measured in ° C. and is the maximum of the resultant curve, and where the semicrystalline propylene polymer composition can be broken down into from 40 to 85% by weight of a principal component A,
from 0 to 55% by weight of an ancillary component B, and
from 0 to 55% by weight of an ancillary component C, where the proportions of components A, B and C are determined by carrying out TREF (temperature rising elution fractionation) in which the polymers are firstly dissolved in boiling xylene and the solution is then cooled at a cooling rate of 10° C./h to 25° C., and then, as the temperature rises, that fraction of the propylene polymer composition which is soluble in xylene at $(T_M/2)+7.5°$ C. is then dissolved and separated off from the remaining solid, and then, as the temperature rises, at all of the higher temperatures 70° C., 75° C., 80° C., 85° C., 90° C., 94° C., 98° C., 102° C., 107° C., 112° C., 117° C., 122° C. and 125° C. the fractions soluble within the temperature range between this elution temperature and the preceding elution temperature are eluted, and the fractions taken into consideration during the evaluation which follows are those whose proportion by weight is at least 1% by weight of the initial weight of the propylene polymer composition specimen, and gel permeation chromatography (GPC) at 145° C. in 1,2,4-trichlorobenzene is used to measure the molar mass distribution of all of the fractions to be taken into consideration, and the principal component A is formed by all of the fractions which are eluted at above $(T_M/2)+7.5°$ C. and have an average molar mass $M_n$ (number average)$\geq 120,000$ g/mol, the ancillary component B is formed by the fraction which is eluted at $(T_M/2)+7.5°$ C., and the ancillary component C is formed by all of the fractions to be taken into consideration and which are eluted at above $(T_M/2)+7.5°$ C. and have an average molar mass $M_n$ (number average)$<120,000$ g/mol, and where at least one of the fractions forming the principal component A has a ratio between weight-average $(M_w)$ and number-average $(M_n)$ molar masses of the polymers $M_w/M_n>4.5$.

In addition, semicrystalline propylene polymer compositions have been found which have good suitability for producing biaxially oriented films and are prepared by polymerizing propylene, ethylene and/or $C_4$–$C_{18}$-1-alkenes, where at least 50 mol % of the monomer units present arise from polymerizing propylene, and the compositions have a melting point $T_M$ of from 65 to 170° C., where the semicrystalline propylene polymer composition can be broken down into
from 40 to 85% by weight of a principal component A,
from 15 to 55% by weight of an ancillary component B, and
from 0 to 40% by weight of an ancillary component C, and the room-temperature xylene-soluble fraction $X_L$ of the semicrystalline propylene polymer composition is not more than 5% by weight.

The use of the semicrystalline propylene polymer composition for producing films, fibers or moldings has also been found, as have the films, fibers and moldings made from this composition.

The novel semicrystalline propylene polymer compositions are prepared by polymerizing propylene, ethylene and/or $C_4$–$C_{18}$-1-alkenes. For the purposes of the present invention, $C_4$–$C_{18}$-1-alkenes are linear or branched 1-alkenes which have from 4 to 18 carbon atoms. Preference is given to linear 1-alkenes, and particular mention is made of ethylene, 1-butene, 1-pentene, 1-hexene, 1-heptene and 1-octene and mixtures made from these comonomers, and preference is given to the use of ethylene or 1-butene. The propylene polymer compositions comprise at least 50 mol % of monomer units which arise from polymerizing propylene. The content of propylene-derived monomer units is preferably at least 70 mol % and in particular at least 85 mol %. In another preferred embodiment, propylene is the sole monomer used in preparing the novel propylene polymer compositions, meaning that the polymer is a propylene homopolymer. If use was made of one or more comonomers it may be that the entire propylene polymer composition has substantially the same comonomer distribution, like that of random copolymers. However, it may also be that, as in what are known as propylene impact copolymers, there is a mixture of different components which have different comonomer contents.

The novel semicrystalline propylene polymer compositions have melting points $T_M$ of from 65 to 170° C., preferably from 135 to 165° C.

For the purposes of the present invention, the melting point $T_M$ is the temperature of the maximum of the plot of enthalpy against temperature for a previously melted specimen heated at a heating rate of 20° C./min obtained using differential scanning calorimetry (DSC) to ISO 3146. The DSC measurement here is usually carried out by first heating the specimen at a heating rate of 20° C./min to about 40° C. above the melting point, then allowing the specimen to undergo dynamic crystallization at a cooling rate of 20° C./min and then determining the melting point $T_M$ during a second heating procedure at a heating rate of 20° C./min.

To determine the proportions of components A, B and C in the semicrystalline propylene polymer compositions, according to the invention a fractionation is carried out using TREF (temperature rising elution fractionation) and the molar mass distribution of all of the fractions is then measured by gel permeation chromatography (GPC).

GPC and TREF are methods for using various physical properties to fractionate polymer specimens. While GPC fractionates polymer chains by their size, the separation in TREF is by crystallizability of the polymer molecules. The principle of temperature rising elution fractionation was described in detail in L. Wild, Advances in Polymer Sciences 98, 1–47 (1990), by way of example. In this technique, a polymer specimen is dissolved in a solvent at an elevated temperature, and the concentration of the solution should be below 2% by weight. The polymer solution is then cooled very slowly (about 0.1° C./min). The first polymer molecules to precipitate are then those which crystallize very well, and these are followed by molecules with poorer crystallization properties. In the polymer particles produced in the solvent, therefore, the crystallizability of the molecules of which these particles are composed decreases from the inside toward the outside. The cooling is followed by the actual fractionation by heating the polymer suspension. During this process, the molecules which crystallize poorly, located on the periphery of the polymer particles, are first dissolved at a relatively low temperature and are removed with the solvent which has dissolved them, followed at a higher temperature by the polymer chains which crystallize more readily.

BRIEF DESCRIPTION OF THE FIGURE

The apparatus shown diagrammatically in FIG. 1 has proven particularly suitable for carrying out TREF. This is composed of a temperature-controllable storage tank (1), a temperature-controllable elution vessel (2), two thermostats (3) (type HC5 from Julabo, for example), two temperature sensors (4) and a high-performance mixer (5) with which the polymer suspension is mixed. In the lower part of the elution vessel, separated off by wire netting, there is glass wool (6) which prevents undissolved polymer particles from being discharged when polymer solutions are run off.

According to the invention, to characterize semicrystalline propylene polymer compositions the polymer is first dissolved in xylene. In principle it is possible here to use any xylene isomer, isomer mixture or isomer mixture with ethylbenzene content, and for economic reasons isomer mixtures are preferred. However, it is advantageous to avoid use of pure p-xylene and of isomer mixtures with a p-xylene content of more than about 50% by weight, since p-xylene freezes at about 20° C.

To dissolve the polymer specimen it is placed, for example, together with the solvent in a glass vessel with a magnetic stirrer rod, underneath a reflux condenser, and the glass vessel is then heated in a temperature-controllable bath with stirring until the polymer has dissolved completely. The polymer solution is then cooled, e.g. by dipping the glass vessel into the preheated oil bath of a thermostat system, at a cooling rate of 10° C./h until room temperature has been reached. The specified cooling may be achieved by appropriately programming a programmer associated with the thermostat system. 5 g of propylene polymer are usually dissolved in 400 ml of xylene for each TREF analysis.

The polymer suspension resulting from the specified crystallization procedure is transferred into the elution vessel (2) of the apparatus shown in FIG. 1, the temperature is raised to $(T_M/2)+7.5°$ C. and the polymer crystals are extracted at this temperature for 15 minutes with vigorous mixing. The polymer solution is then run off, while the crystals remain in the extractor. The dissolved polymer is preferably precipitated in cold acetone (at <0° C.), filtered off and dried for from 4 to 5 hours at 100° C. in vacuo.

400 ml of xylene which has been temperature-controlled to the next higher of the temperatures 70° C., 75° C., 80° C., 85° C., 90° C., 94° C., 98° C., 102° C., 107° C., 112° C., 117° C., 122° C. and 125° C. are then added to the polymer crystals in the elution vessel (2), followed again by mixing for 15 minutes at this next higher temperature. This dissolves those fractions of the semicrystalline propylene polymer composition which are soluble within the temperature range between this elution temperature and the preceding elution temperature. The resultant solution is then run off, while the crystals remain in the extractor.

This process is repeated until all of the polymer crystals have been dissolved. This stage was achieved at 125° C. or below in the case of all the polypropylenes studied so far.

The dissolved polymers from each of the fractions are preferably precipitated in cold acetone (<0° C.), filtered off and dried for from 4 to 5 hours at 100° C. in vacuo.

Since there are some losses during the fractionation of any polymer composition, even though the losses may be slight, the amounts of the fractions generally give a total which is less than the initial weight of the polymer specimen. This phenomenon can be ignored as long as at least 96% of the initial weight of the propylene polymer composition is retrieved in the fractions. However, if the loss is higher, the fractionation must be repeated.

It is also not possible to determine the molar mass distribution reliably if the amounts of specimen used are extremely small. To minimize error, the fractions to be taken into consideration in carrying out the evaluation which follows to calculate the amounts of components A, B and C are only those whose proportion of the initial polymer specimen weight is at least 1% by weight. The molar mass distribution of these fractions is determined by gel permeation chromatography (GPC) in 1,2,4-trichlorobenzene at 145° C., calibrating the GPC with polypropylene standards with molar masses of from 100 to $10^7$ g/mol.

The fractions can then be allocated to each of the components A, B and C according to the temperature at which the respective fraction was eluted, i.e. the temperature within the temperature sequence 70° C., 75° C., 80° C., 85° C., 90° C., 94° C., 98° C., 102° C., 107° C., 112° C., 117° C., 122° C. at which the polymer chains dissolved, and according to the average molar mass $M_n$ (number average) of the respective fraction.

The principal component A is formed by all of the fractions to be taken into consideration and which are eluted at above $(T_M/2)+7.5°$ C. and have an average molar mass $M_n$ (number average) $\geq 120,000$ g/mol.

The ancillary component B is formed by the fraction which is eluted at $(T_M/2)+7.5°$ C. If the proportion of the fraction eluted at $(T_M/2)+7.5°$ C. is less than 1% by weight of the entire propylene polymer composition, the proportion of the ancillary component B is 0% by weight according to the definition given above for the fractions to be taken into consideration.

The ancillary component C is formed by all of the fractions to be taken into consideration which are eluted at above $(T_M/2)+7.5°$ C. and have an average molar mass $M_n$ (number average) $<120,000$ g/mol.

Because of the losses during TREF and because fractions whose proportion of the propylene polymer composition is less than 1% by weight are not given any further consideration, the amounts of components A, B and C obtained experimentally give a total which is less than the initial weight of polymer taken for fractionation and used as a basis. Since the proportions of components A, B and C are usually given in % by weight, the total of the proportions of components A, B and C therefore differs from 100% by weight. This difference may be termed Z and quantified by the formula $$Z = 100\% \text{ by weight} - (A+B+C)$$

where A, B and C are the ratio of the amounts found of components A, B and C to the initial weight of the propylene polymer composition specimen in % by weight and Z is also given in % by weight.

To interpret the good properties of the novel propylene polymer compositions, it can be assumed that in particular a high content of principal component A brings about high stiffness in the films. The content of ancillary component B affects the processing speed, and the content of ancillary component C has the task of providing a broad range of temperature latitude.

Another variable for characterizing the novel propylene polymer compositions is the room-temperature xylene-soluble fraction XL, which for the purposes of the present invention is the fraction determined by a method similar to that of ISO 1873–1:1991. For this, 5 g of polypropylene are placed into 500 ml of distilled xylene previously heated to 100° C. The mixture is then heated to the boiling point of the xylene and held for 60 min at this temperature. Then, within a period of 20 min, the mixture is cooled to 5° C. using a cooling bath and then reheated to 20° C., and this temperature is held for 30 min. The precipitated polymer is filtered off. Precisely 100 ml of the filtrate are drawn off and the solvent removed on a rotary evaporator. The residue is dried for about 2 h at 80° C./250 mbar to constant weight and weighed after cooling.

The xylene-soluble fraction is calculated as $$X_L = \frac{g \times 500 \times 100}{G \times V}$$

where $X_L$=xylene-soluble fraction in %,
g=amount found in g,
G=initial weight of product in g, and
V=volume of filtrate used in ml.

In one embodiment of the present invention the novel semicrystalline propylene polymer compositions can be broken down into from 40 to 85% by weight, preferably from 50 to 80% by weight and in particular from 55 to 75% by weight, of the principal component A, from 0 to 55% by weight, preferably from 0 to 30% by weight and in particular from 5 to 20% by weight, of the ancillary component B, and from 0 to 55% by weight, preferably from 5 to 40% by weight and in particular from 10 to 35% by weight, of the ancillary component C, where at least one of the fractions forming the principal component A has a ratio between weight-average ($M_w$) and number-average ($M_n$) molar masses of the polymers $M_w/M_n>4.5$, preferably >5 and in particular >6. The fractions forming the principal component A and having a ratio $M_w/M_n>4.5$ preferably make up at least 10% by weight, in particular at least 20% by weight and very particularly preferably at least 30% by weight, of the principal component A.

In this embodiment, the semicrystalline propylene polymer compositions therefore have broad molar mass distribution of the highly isotactic fractions. Compared with conventional polypropylenes used for producing BOPP films, they achieve, for example, better mechanical properties in the films and better barrier properties, without giving any disadvantages in processibility.

In another embodiment of the present invention, the semicrystalline propylene polymer compositions can be broken down into from 40 to 85% by weight, preferably from 45 to 75% by weight and in particular from 50 to 70% by weight, of the principal component A, from 15 to 55% by weight, preferably from 15 to 45% by weight and in particular from 20 to 35% by weight, of the ancillary component B, and from 0 to 40% by weight, preferably from 5 to 35% by weight and in particular from 5 to 30% by weight, of the ancillary component C, where the room-temperature xylene-soluble fraction $X_L$ in the semicrystalline propylene polymer composition is not more than 5% by weight, preferably not more than 4% by weight. Particularly preferred propylene polymer compositions of this embodiment have a fraction $X_L$ which is not more than 3% by weight.

The semicrystalline propylene polymer compositions of this embodiment have a relatively high content of low-tacticity fractions which are soluble in xylene at $(T_M/2)+7.5°$ C. but not at room temperature and have small room-temperature xylene-soluble fractions. Compared with conventional polypropylenes used for producing BOPP films, they have better processibility, reflected in greater temperature- and speed-latitude during processing, and better optical properties, without any disadvantages for the mechanical properties of the films.

The substantial factor in relation to the properties of the novel propylene polymer compositions is their content of components A, B and C. The process which prepared the respective mixtures of differing polymer chains is not critical per se.

For example, two or more starting polymers may be polymerized separately and then mixed using suitable mixing equipment, such as screw extruders, Diskpack plasticators, kneaders or roll mills.

However, the propylene polymer compositions are preferably not polymerized separately. In that case it is possible to use a mixture of two or more different catalysts which, under the polymerization conditions established, deliver different polypropylenes, or to use a catalyst which in itself has different active centers, so that the catalyst itself delivers appropriate mixtures of polymer chains. Another way is to polymerize in various reactors, for example in a reactor cascade, under conditions sufficiently different to give the desired composition as final product.

The constituents of the novel propylene polymer composition, or the entire propylene polymer composition, may be produced in a known manner in bulk, in suspension or in the gas phase, in the usual reactors used for polymerizing propylene, either batchwise or preferably continuously, in one or more stages. The polymerizations are generally carried out at from 20 to 150° C. and at pressures of from 1 to 100 bar with average residence times of from 0.5 to 5 hours, preferably at from 60 to 90° C. and at pressures of from 20 to 35 bar and with average residence times of from 0.5 to 3 hours.

Use is made here in particular of the Ziegler-Natta catalyst systems usual in polymerization technology. These are generally composed of a titanium-containing solid component, the preparation of which frequently uses, besides titanium compounds, inorganic or polymeric fine-particle supports, compounds of magnesium, halogen compounds and electron-donor compounds, and of at least one cocatalyst. Aluminum compounds may be used as cocatalysts. Besides an aluminum compound, it is preferable for one or more electron-donor compounds to be used as further cocatalysts.

The propylene polymers may also be prepared using catalyst systems based on metallocene compounds. For the purposes of the present invention, metallocenes are complex compounds made from metals of transition groups of the Periodic Table with organic ligands, and these together with metallocenium-ion-forming compounds give effective catalyst systems.

The central atom present in the metallocenes usually used is titanium, hafnium or preferably zirconium, and the central atom generally has bonding via a π bond to at least one, generally substituted, cyclopentadienyl group. The metallocene complexes are frequently in supported form in the catalyst systems. The metallocenium-ion-forming compounds present in the metallocene catalyst systems are moreover usually aluminoxane compounds or strong, neutral Lewis acids, ionic compounds with Lewis-acid cations or ionic compounds with Bronsted acids as cation.

The novel semicrystalline propylene polymer composition preferably has a molar mass (weight average $M_w$) of from 50,000 to 800,000 g/mol. Its melt flow rate at 230° C. under a load of 2.16 kg to ISO 1133 is from 0.1 to 100 g/10 min, preferably from 0.5 to 50 g/10 min and in particular from 1 to 10 g/10 min.

It is usual for customary amounts of conventional additives, such as stabilizers, lubricants, mold-release agents, fillers, nucleating agents, antistats, plasticizers, dyes, pigments or flame retardants to be added to the novel semicrystalline propylene polymer composition prior to its use. These are usually incorporated into the polymer during pelletization of the polymerization product produced in pulverulent form.

The usual stabilizers are antioxidants, such as sterically hindered phenols, process stabilizers, such as phosphites or phosphonites, acid scavengers, such as calcium stearate, zinc stearate or dihydrotalcite, sterically hindered amines, or else UV stabilizers. The novel propylene polymer composition generally comprises amounts of up to 2% by weight of one or more of the stabilizers.

Examples of suitable lubricants and mold-release agents are fatty acids, the calcium or zinc salts of the fatty acids, fatty amides and low-molecular-weight polyolefin waxes, and these are usually used in concentrations of up to 2% by weight.

Examples of fillers which may be used for the propylene polymer composition are talc, chalk and glass fibers, and the amounts which may be used here are up to 50% by weight.

Examples of suitable nucleating agents are inorganic additives, such as talc, silica or kaolin, salts of mono- or polycarboxylic acids, such as sodium benzoate or aluminum tert-butylbenzoate, dibenzylidenesorbitol or its $C_1$-$C_8$-alkyl-substituted derivatives, such as methyl- or dimethyldibenzylidenesorbitol, and salts of diesters of phosphoric acid, such as sodium 2,2'-methylenebis(4,6-di-tert-butylphenyl) phosphate. The content of nucleating agents in the propylene polymer composition is generally up to 5% by weight.

Additives of this type are generally commercially available and are described, for example, in Gächter/Müller, Plastics Additives Handbook, 4th Edition, Hansa Publishers, Munich, 1993.

The good performance characteristics of the novel semicrystalline propylene polymer compositions make them especially suitable for producing films, fibers or moldings and in particular for producing biaxially stretched films.

The invention also provides biaxially stretched films produced from the novel semicrystalline propylene polymer compositions and having a stretching ratio of at least 1:3 longitudinally and of at least 1:5 transversely.

Biaxially stretched films may be produced by melt extrusion of the propylene polymer composition, whereupon the discharged melt is first cooled to between 100 and 20° C. for solidification, and the solidified film is then stretched longitudinally at from 80 to 150° C. with a stretching ratio of at least 1:3 and transversely at from 120 to 170° C. with a stretching ratio of at least 1:5.

To this end, the semicrystalline propylene polymer compositions are melted at from 220 to 300° C., preferably from 240 to 280° C., for example, in an extruder, where other additives or polymers may be added in the extruder, and the melt is extruded through a slot die or an annular die.

The resultant film is then solidified by cooling. By extrusion through a slot die (flat-film die) the cooling generally takes place via one or more take-off rolls whose surface temperature is from 10 to 100° C., preferably from 15 to 70° C., for example. If an annular die is used, the film bubble is usually cooled by air or water at from 0 to 40° C.

The resultant film is then stretched longitudinally and transversely to the direction of extrusion, orienting the molecular chains. The sequence of stretching is not critical. In flat-film-die extrusion the first stretching is generally longitudinal, carried out with the aid of two or more pairs of rolls running at different speeds corresponding to the desired stretching ratio. This is followed by transverse stretching using appropriate equipment comprising clips. It is also possible for the longitudinal and transverse stretching to take place simultaneously using suitable equipment comprising clips. If an annular die is used, stretching in both directions usually takes place simultaneously by injection of gas into the film bubble.

Prior to the stretching of the film, it may be heated to between 60 and 110° C., for example. The longitudinal stretching preferably takes place at from 80 to 150° C., in particular from 100 to 130° C., and the transverse stretching at from 120 to 190° C., in particular from 145 to 180° C. The longitudinal stretching ratio is generally at least 1:3, preferably from 1:4 to 1:7 and in particular from 1:4.5 to 1:5. The transverse stretching ratio is generally at least 1:5, preferably from 1:6 to 1:12 and in particular from 1:7 to 1:10.

The biaxial stretching may be followed by a heat treatment for thermosetting, in which the film is held at from 100 to 160° C. for from about 0.1 to 10 s. The film is then wound up in the usual manner by wind-up equipment.

During or after production of the BOPP film, one or both surfaces may be corona- or flame-treated by one of the known methods, or, if required, metallized, for example with aluminum.

It is also possible for the novel semicrystalline propylene polymer composition to form just one layer, or just some of the layers, of a multilayer biaxially stretched film.

The biaxially stretched films produced from the novel semicrystalline propylene polymer compositions have in particular excellent stiffness, excellent barrier action and excellent transparency.

EXAMPLES

The following tests were carried out to characterize the specimens:

Determination of Average Particle Diameter:

To determine the average particle diameter of the silica gel the particle size distribution of the silica gel particles was determined by Coulter Counter Analysis to $AST_M$ D 4438 and the volume-based average (median) calculated from the results.

Determination of Pore Volume:

By mercury porosimetry to DIN 66133

Determination of Specific Surface Area:

By nitrogen adsorption to DIN 66131

Determination of Water Content:

To determine the water content, 5 g of silica gel were dried for 15 min at 160° C. at atmospheric pressure (constant weight). The weight loss corresponds to the initial water content.

Determination of Ethylene Content:

The ethylene content was determined by $^{13}C$ NMR spectroscopy on polymer pellets.

Determination of Melt Flow Rate (MFR):

to ISO 1133 at 230° C. under a load of 2.16 kg.

Determination of $T_M$:

The melting point $T_M$ was determined by DSC to ISO 3146 using a first heating procedure with a heating rate of 20° C. per minute to 200° C., dynamic crystallization at a cooling rate of 20° C. per minute to 25° C. and a second heating procedure with a heating rate of 20° C. per minute, again to 200° C. The melting point $T_M$ is then the temperature of the maximum in the plot of enthalpy against temperature measured during the second heating procedure.

TREF Fractionation:

The solvent used comprised industrial xylene with less than 0.1% by weight of nonvolatile fractions, and with 5 grams per liter of 2,6-di-tert-butyl-4-methylphenol added as stabilizer. For each fractionation, 5 g of the propylene polymer composition were dissolved in 400 ml of boiling xylene, and the solution was then cooled linearly at a cooling rate of 10° C./h to 25° C., whereupon most of the polymer precipitated.

The crystalline suspension was transferred into the 500 ml temperature-controllable extraction apparatus shown in FIG. 1 and heated to the first elution temperature: $(T_M/2)+7.5°$ C. Before measurements were made the entire apparatus was flushed with nitrogen. The gas space above the extraction liquids remained under nitrogen during the extraction. The polypropylene crystals were extracted for 15 minutes at this temperature with vigorous mixing. The polymer solution was then run off, while the polypropylene crystals remained in the extractor. The dissolved polymer was precipitated in cold acetone (<0° C.), filtered off and dried for from 4 to 5 hours at 100° C. in vacuo.

The extractor was then heated to the next elution temperature in the temperature sequence 70° C., 75° C., 80° C., 85° C., 90° C., 94° C., 98° C., 102° C., 107° C., 112° C., 117° C., 122° C. and 400 ml of xylene at the same temperature were added. Extraction was repeated for 15 minutes with vigorous mixing, the polymer solution was run off, and the dissolved polymer was precipitated in cold acetone, filtered off and dried. These steps were repeated until all of the propylene homopolymer had dissolved.

The content calculated for each TREF fraction gives the content which has dissolved during the extraction at the temperature given. The % by weight data here are based on the initial sample weight of 5 g. As a result of losses during weighing and filtration, therefore, the total of the fractions is in each case not quite 100% by weight.

Gel Permeation Chromatography (GPC):

The gel permeation chromatography (GPC) at 145° C. was carried out at 145° C. in 1,2,4-trichlorobenzene using a Waters 150C GPC apparatus. The data were evaluated using Win-GPC software from HS-Entwicklungsgesellschaft fur wissenschaftliche Hardund Software mbH, Ober-Hilbersheim, Germany. The columns were calibrated using polypropylene standards with molar masses of from 100 to $10^7$ g/mol.

The weight-average ($M_w$) and number-average ($M_n$) molar masses of the polymers were determined. The value Q is the ratio of the weight average ($M_w$) to the number average ($M_n$).

Determination of the Proportions of Components A, B and C:

A TREF analysis was carried out with the propylene polymer composition to be studied. In the evaluation which followed, the fractions taken into consideration were all of those whose proportion by weight was more than 1%. The molar mass distribution of all of the fractions to be taken into consideration was determined using GPC.

The proportion by weight of the ancillary component B is the proportion by weight of the fraction which was obtained at the first elution temperature, i.e. at $(T_M/2)+7.5°$ C.

The proportion by weight of the principal component A is the proportion by weight of all of the fractions obtained at higher elution temperatures and having an average molar mass $M_n$ (number average)$\geq$120,000 g/mol.

The ancillary component C is formed by all of the fractions obtained at temperatures higher than $(T_M/2)+7.5°$ C. and having an average molar mass $M_n$ (number average)<120,000 g/mol.

The difference Z, where $$Z=100\% \text{ by weight}-(A+B+C)$$

quantifies those fractions of the propylene polymer composition initially weighed which were not taken into consideration in calculating the amounts of components A, B and C because of losses occurring during TREF or because the amounts of particular fractions were below the limit.

Determination of Processing Latitude:

During production of the BOPP films the stretching temperature was varied to determine the temperature range within which BOPP films can be obtained. This temperature range has a higher-temperature limit resulting from tearing of the film due to melting, and has a lower-temperature limit resulting from tearing of the film due to inhomogeneity caused by incomplete melting, or from solidification of the film to the extent that it slips out of the orienting equipment.

The procedure was to begin with a processing temperature which ensured stable running. The stretching temperature was then raised in steps of 2° C. until the film tore. The next temperature was set here as soon as 1000 m of film could be produced at one temperature without tearing. Then, again starting at the initial temperature, the stretching temperature was lowered in steps of 2° C. until the film again tore or slipped out of the orienting equipment.

Determination of Maximum Take-Off Speed:

During production of the BOPP films the take-off speed was varied to establish the range within which BOPP films can be obtained. This range has a higher-speed limit as a result of tearing of the film due to inhomogeneity or to excessive tension.

The procedure was to begin at a take-off speed which ensured stable running (the stretching temperature here was 160° C.). The take-off speed was then increased in steps of 25 m/min until the film tore. The next speed here was established once 1000 m of film could be produced at one speed without tearing.

Determination of Modulus of Elasticity (Tensile Modulus of Elasticity):

Longitudinal and transverse strips of width 15 mm were cut out from biaxially stretched films and used to determine the tensile modulus of elasticity to ISO 527-2 at 23° C.

Determination of Haze:

To $AST_M$ D-1003.

Determination of Water Vapor Barrier Properties $H_2O$ permeability measured to DIN 53122.

Determination of Oxygen Barrier Properties $O_2$ permeability measured to $AST_M$ D3985-81.

Example 1 a) Preparation of a Titanium-Containing Solid Component

A fine-particle spherical silica gel prepared by spray drying and having an average particle diameter of 45 μm, a pore volume of 1.5 cm³/g, a specific surface area of 260 m²/g and a water content of 2.7% by weight was mixed with a solution of n-butyloctylmagnesium in n-heptane, using 0.3 mol of the magnesium compound per mole of $SiO_2$. The solution was stirred for 45 minutes at 95° C., then cooled to 20° C., and, based on the organomagnesium compound, ten times the molar amount of hydrogen chloride was passed into the mixture. After 60 minutes the reaction product was mixed with 3 mol of ethanol per mole of magnesium, with constant stirring. This mixture was stirred for 0.5 hour at 80° C. and then mixed with, based in each case on 1 mol of magnesium, 7.2 mol of titanium tetrachloride and 0.5 mol of di-n-butyl phthalate. This was followed by stirring for 1 hour at 100° C., filtering off the resultant solid and washing several times with ethylbenzene.

The resultant solid product was extracted for 3 hours at 125° C. with a 10% strength by volume solution of titanium tetrachloride in ethylbenzene. The solid product was then separated from the extraction medium by filtration and washed with n-heptane until the remaining content of titanium tetrachloride in the extraction medium was only 0.3% by weight.

The titanium-containing solid component comprised 3.5% by weight of Ti
7.4% by weight of Mg
28.2% by weight of Cl.

b) Polymerization

The polymerization was carried out in a continuously operated cascade of two vertically agitated gas-phase reactors each with a useful volume of 200 l and arranged in series, both reactors comprising a moving solid bed of fine-particle polymer. The catalyst system used was one made from the titanium-containing solid component prepared in Example 1a) and also from the further components triethylaluminum and dicyclopentyldimethoxysilane.

Gaseous propylene, the titanium-containing solid component, and also triethylaluminum and dicyclopentyldimethoxysilane, were passed into the first gas-phase reactor. The amount of triethylaluminum added here was set at 210 mmol per g of titanium-containing solid component, and the amount of dicyclopentyldimethoxysilane was set at 0.02 mol per mole of triethylaluminum. Any addition of hydrogen as molar-mass regulator was completely dispensed with. The polymerization took place at a pressure of 28 bar and at 80° C.

The propylene homopolymer obtained in the first gas-phase reactor was transferred into the second gas-phase reactor together with catalyst constituents which were still active, and the polymerization was continued there at a pressure of 20 bar and at 70° C. Hydrogen was passed into the second reactor in sufficient amounts to give a constant proportion of 11% by volume of hydrogen in the gas space. During this procedure, the composition of the gas was determined using a gas chromatograph at intervals of five minutes and regulated by tracking the amounts fed. Dicyclopentyldimethoxysilane was moreover again added in the second reactor in amounts sufficient for the total amount of dicyclopentyldimethoxysilane added to be 0.1 mol per mole of triethylaluminum.

The output from the reactor cascade was adjusted to 48 kg/h via the amount of the titanium-containing solid component fed. The productivity obtained was 13,300 g of polymer per g of titanium-containing solid component.

During pelletization, a stabilizer usually used for propylene polymers and based on tetrakis(methylene 3,5-di-tert-butylhydroxyhydrocinnamate)methane and tris(2,4-di-tert-butylphenyl) phosphite was incorporated. The resultant propylene polymer composition had a melting point of 165° C., a melt flow rate of 2.1 g/10 min and a room-temperature xylene-soluble fraction of 3.1% by weight. It was broken down into the fractions given in Table 1 by TREF. The yield from the fractionation, i.e. the total of the proportions by weight of the fractions, was 99.5% by weight.

TABLE 1

| Fraction | Elution temperature [° C.] | Proportion by weight [% by weight] | Average molar mass of fraction (number average $M_n$) [g/mol] | $M_w/M_n$ |
|---|---|---|---|---|
| 1 | 90 | 7.3 | 13800 | 5.6 |
| 2 | 94 | 2.0 | 17800 | 2.3 |
| 3 | 98 | 3.6 | 22900 | 2.0 |
| 4 | 102 | 8.9 | 36000 | 2.3 |
| 5 | 107 | 14.7 | 49300 | 2.4 |
| 6 | 112 | 37.7 | 144300 | 4.7 |
| 7 | 117 | 13.6 | 126300 | 6.2 |
| 8 | 122 | 8.8 | 247800 | 3.5 |
| 9 | 125 | 2.9 | 272300 | 3.6 |

Since $(T_M/2)+7.5°$ C. was 90° C. for the propylene polymer composition studied the first fraction was eluted at 90° C. Fractions 2 to 5 at 94, 98, 102 and 107° C. together form component C and fractions 6 to 9 at 112, 117, 122 and 125° C. form component A. This therefore gave a composition made of

| Principal component A: | 63.0% by weight |
|---|---|
| Ancillary component B: | 7.3% by weight, and |
| Ancillary component C: | 29.2% by weight. |

The difference Z was therefore 0.5% by weight.

c) Production of a BOPP Film

The semicrystalline propylene polymer composition obtained was used to produce a biaxially stretched film of thickness about 20 μm. The film was produced on a Bruckner Maschinenbau pilot plant with a 1.3 m flat-film die. The throughput was 150 kg/h. The extruded film was cooled to 40° C. and the solidified film stretched longitudinally at 116° C. with a stretching ratio of 4.5:1 and transversely at 157° C. with a stretching ratio of 8:1. The properties of the biaxially stretched film produced can be found in Table 3 below.

Example 2 a) Preparation of a Titanium-Containing Solid Component

The catalyst solid prepared in Example 1a) was used.

b) Polymerization

The polymerization took place in the reactor cascade also used in Example 1b) with a catalyst system made from the titanium-containing solid component prepared in Example 1a) and the further components triethylaluminum and dicyclopentyldimethoxysilane.

Gaseous propylene, the titanium-containing solid component, and also triethylaluminum and dicyclopentyldimethoxysilane, were passed into the first gas-phase reactor. The amount of triethylaluminum added here was set at 210 mmol per g of titanium-containing solid component, and the amount of dicyclopentyldimethoxysilane was set at 0.1 mol per mole of triethylaluminum. Any addition of hydrogen as molar-mass regulator was completely dispensed with. The polymerization took place at a pressure of 28 bar and at 80° C.

The propylene homopolymer obtained in the first gas-phase reactor was transferred into the second gas-phase reactor together with catalyst constituents which were still active, and in this reactor a mixture of propylene and ethylene was continuously polymerized onto the homopolymer at a pressure of 20 bar and at 70° C. The polymerization in the second reactor also took place in the presence of hydrogen. The amounts of ethylene and hydrogen passed into the mixture were sufficient to give a constant proportion of 3% by volume of ethylene and 17% by volume of hydrogen in the gas space. During this procedure, the composition of the gas was determined using a gas chromatograph at intervals of five minutes and regulated by tracking the amounts fed.

The output from the reactor cascade was adjusted to 44 kg/h via the amount of the titanium-containing solid component fed. The productivity obtained was 17,400 g of polymer per g of titanium-containing solid component.

During pelletization, a stabilizer usually used for propylene polymers and based on tetrakis(methylene 3,5-di-tert-butylhydroxyhydrocinnamate)methane and tris(2,4-di-tert-butylphenyl) phosphite was incorporated. The resultant propylene polymer composition had a melting point of 163.2° C., a melt flow rate of 2.2 g/10 min and a room-temperature xylene-soluble fraction of 3.4% by weight. The ethylene content was 1.5% by weight. It was broken down into fractions by TREF. The yield from the fractionation was 97.2% by weight.

This gave a composition made of

| | |
|---|---|
| Principal component A: | 60.7% by weight |
| Ancillary component B: | 28.2% by weight, and |
| Ancillary component C: | 8.3% by weight. |

The difference Z was therefore 2.8% by weight.

The maximum ratio $M_w/M_n$ of the fractions forming component A was 3.7.

c) Production of a BOPP Film

The semicrystalline propylene polymer composition obtained was used to produce a biaxially stretched film of thickness about 20 μm. The film was produced on a Bruckner Maschinenbau pilot plant with a 1.3 m flat-film die. The throughput was 150 kg/h. The extruded film was cooled to 40° C. and the solidified film stretched longitudinally at 116° C. with a stretching ratio of 4.5:1 and transversely at 157° C. with a stretching ratio of 8:1. The properties of the biaxially stretched film produced can be found in Table 3 below.

Comparative Example A

A biaxially stretched film of thickness about 20 μm was produced as in Example 1 with a propylene homopolymer used commercially for OPP film production (Novolen® 1104 K from Targor GmbH).

A melting point of 165.5° C., a melt flow rate of 3.2 g/10 min and a room-temperature xylene-soluble fraction of 3.2% by weight were determined for the Novolen® 1104 K used. It was broken down by TREF into the fractions given in Table 2. The yield of the fractionation was 96.7% by weight.

TABLE 2

| Fraction | Elution temperature [° C.] | Proportion by weight [% by weight] | Average molar mass of fraction (number average $M_n$) [g/mol] | $M_w/M_n$ |
|---|---|---|---|---|
| 1 | 90.25 | 4.6 | 27200 | 3.4 |
| 2 | 94 | 1.6 | 38900 | 2.1 |
| 3 | 98 | 2.6 | 39400 | 1.9 |
| 4 | 102 | 3.9 | 46300 | 1.7 |
| 5 | 107 | 9.3 | 66300 | 1.9 |
| 6 | 112 | 48.7 | 156600 | 2.6 |
| 7 | 117 | 25.3 | 185900 | 2.6 |
| 8 | 122 | 0.7 | — | — |

Since $(T_M/2)+7.5°$ C. was 90.25° C. for the propylene polymer composition studied, the first fraction was eluted at this temperature. Fractions 2 to 5 at 94, 98, 102 and 107° C. together form component C, and fractions 6 and 7 at 112 and 117° C. form component A. The proportion by weight of fraction 8 was below 1% by weight. This fraction is therefore part of Z. This therefore gave a composition made of

| | |
|---|---|
| Principal component A: | 74.0% by weight |
| Ancillary component B: | 4.6% by weight, and |
| Ancillary component C: | 17.4% by weight. |

The difference Z was therefore 4.0% by weight.

The film properties can be found in Table 3 below.

Comparative Example B

A biaxially stretched film of thickness about 20 μm was produced as in Example 1 with a propylene homopolymer used commercially for OPP film production (Novolen® NQ 10134 from Targor GmbH).

A melting point of 163.1° C., a melt flow rate of 3.4 g/10 min and a room-temperature xylene-soluble fraction of 3.5% by weight were determined for the Novolen®NQ 10134 used. It was broken down by TREF into fractions. The yield of the fractionation was 97.2% by weight.

This gave a composition made of

| | |
|---|---|
| Principal component A: | 67.0% by weight |
| Ancillary component B: | 8.2% by weight, and |
| Ancillary component C: | 22.0% by weight. |

The difference Z was therefore 2.8% by weight.

The maximum ratio $M_w/M_n$ for the fractions forming component A was 2.5.

Comparative Example C

A biaxially stretched film of thickness about 20 μm was produced as in Example 1 with a random propylene-ethylene copolymer used commercially for OPP film production (Novolen® NX 10094 from Targor GmbH).

A melting point of 155.7° C., a melt flow rate of 2.9 g/10 min, a room-temperature xylene-soluble fraction of 1.7% by weight and an ethylene content of 1.1% by weight were determined for the Novolen® NX 10094 used. It was broken down into the fractions by TREF. The yield of the fractionation was 99.7% by weight.

This gave a composition made of

| | |
|---|---|
| Principal component A: | 88.2% by weight |
| Ancillary component B: | 7.7% by weight, and |
| Ancillary component C: | 3.8% by weight. |

The difference Z was therefore 0.3% by weight.

The maximum ratio $M_w/M_n$ for the fractions forming component A was 2.8.

Table 3 below gives the properties of the biaxially stretched films manufactured from the semicrystalline propylene polymer compositions prepared by way of example.

TABLE 3

| | Example 1 | Example 2 | Comp. Ex. A | Comp. Ex. B | Comp. Ex. C |
|---|---|---|---|---|---|
| Processing latitude [° C.] | 11 | 18 | 12 | 11 | 13 |
| Maximum take-off speed [m/min] | 100 | >200 | 100 | 150 | 100 |
| Longitudinal modulus of elasticity [MPa] | 2600 | 2000 | 2200 | 2000 | 2200 |
| Transverse modulus of elasticity [MPa] | 4800 | 4300 | 4700 | 4500 | 4600 |
| Haze [%] | 2.4 | 1.1 | 2.0 | 1.6 | 2.2 |
| $H_2O$ permeability [g 100 μm/(m² d)] | 0.27 | 0.28 | 0.28 | 0.29 | 0.28 |
| $O_2$ permeability [cm³ 100 μm/(m² d bar)] | 410 | 430 | 430 | 440 | 430 |

From a comparison of the examples with the comparative examples it can be seen that the propylene polymer composition of Example 1 in particular has a broader molar mass distribution, i.e. an increased ratio $M_w/M_n$ in the principal component A, and the propylene polymer composition of Example 2 has an increased proportion of ancillary component B.

Comparison of Example 2 with Comparative Example C shows that the incorporation of ethylene cannot by itself produce propylene polymer compositions whose distribution accords with the invention. This is also apparent from the fact that incorporating 1.1% by weight of ethylene in Comparative Example C lowers the melting point to 155.7° C., whereas in Example 2 the melting point can be held at 163.2° C. despite an ethylene content of 1.5% by weight.

It can be seen from Table 3 that the propylene polymer composition of Example 1 can in particular give better mechanical properties without any loss of processability. There is also an improvement in barrier properties (lower permeability to water vapor and oxygen). The propylene polymer composition of Example 2 has better processability and better optical properties (lower haze) without any need to accept impairment of the mechanical properties of the films or of their barrier properties.

We claim:

1. A semicrystalline propylene polymer composition with good suitability for producing biaxially oriented films and prepared by polymerizing propylene, ethylene and/or $C_4$–$C_{18}$-1-alkenes, where at least 50 mol % of the monomer units present arise from the polymerization of propylene, and with a melting point $T_M$ of from 135 to 165° C., where the melting point $T_M$ is determined by Differential Scanning Calorimetry (DSC) to ISO 3146 by heating a previously melted specimen at a heating rate of 20° C./min, and is measured in ° C., and is the maximum of the resultant curve, and where the semicrystalline propylene polymer composition can be broken down into from 40 to 85% by weight of a principal component A, from 0 to 55% by weight of an ancillary component B, and from 0 to 55% by weight of an ancillary component C, where the proportions of components A, B and C are determined by carrying out TREF (temperature rising elution fractionation) in which the polymers are firstly dissolved in boiling xylene and the solution is then cooled at a cooling rate of 10° C./h to 25° C., and then, as the temperature rises, that fraction of the propylene polymer composition which is soluble in xylene at $(T_M/2)+7.5°$ C. is then dissolved and separated off from the remaining solid, and then, as the temperature rises, at all of the higher temperatures 70° C., 75° C., 80° C., 85° C., 90° C., 94° C., 98° C., 102° C., 107° C., 112° C., 117° C., 122° C. and 125° C. the fractions soluble within the temperature range between this elution temperature and the preceding elution temperature are eluted, and the fractions taken into consideration during the evaluation which follows are those whose proportion by weight is at least 1% by weight of the initial weight of the propylene polymer composition specimen, and gel permeation chromatography (GPO) at 145° C. in 1,2,4-trichlorobenzene is used to measure the molar mass distribution of all of the fractions to be taken into consideration, and the principal component A is formed by all of the fractions which are eluted at above $(T_M/2)+7.5°$ C. and have an average molar mass $M_n$ (number average) $\geq 120,000$ g/mol, the ancillary component B is formed by the fraction which is eluted at $(T_M/2)+7.5°$ C, and the ancillary component C is formed by all of the fractions to be taken into consideration which are eluted at above $(T_M/2)+7.5°$ C. and have an average molar mass $M_n$ (number average)<120,000 g/mol, and where at least one of the fractions forming the principal component A has a ratio between weight-average ($M_w$) and number-average ($M_n$) molar masses of the polymers $M_w/M_n>4.5$.

2. A semicrystalline propylene polymer composition as claimed in claim 1, where the fractions forming the principal component A and having a ratio $M_w/M_n>4.5$ make up at least 10% by weight of the principal component A.

3. A semicrystalline propylene polymer composition as claimed in claim 1, which can be broken down into from 55 to 75% by weight of the principal component A, from 5 to 20% by weight of the ancillary component B, and from 10 to 35% by weight of an ancillary component C.

4. A semicrystalline propylene polymer composition with good suitability for producing biaxially oriented films and prepared by polymerizing propylene, ethylene and/or $C_4$–$C_{18}$-1-alkenes, where at least 50 mol % of the monomer units present arise from the polymerization of propylene, and with a melting point $T_M$ of from 135 to 165° C., where the melting point $T_M$ is determined by Differential Scanning Calorimetry (DSC) to ISO 3146 by heating a previously melted specimen at a heating rate of 20° C./min, and is measured in ° C., and is the maximum of the resultant curve, and where the semicrystalline propylene polymer composition can be broken down into from 50 to 70% by weight of a principal component A, from 20 to 35% by weight of an ancillary component B, and from 5 to 30% by weight of an ancillary component C, where the proportions of components A, B and C are determined by carrying out TREE (temperature rising elution fractionation) in which the polymers are firstly dissolved in boiling xylene and the solution is then cooled at a cooling rate of 10° C./h to 25° C., and then, as the temperature rises, that fraction of the propylene polymer composition which is soluble in xylene at $(T_M/2)+7.5°$ C. is then dissolved and separated off from the remaining solid, and then, as the temperature rises, at all of the higher temperatures 70° C., 75° C., 80° C., 85° C., 90° C., 94° C., 98° C., 102° C., 107° C., 112° C., 117° C., 122° C. and 125° C. the fractions soluble within the temperature range between this elution temperature and the preceding elution temperature are eluted, and the fractions taken into consideration during the evaluation which follows are those whose proportion by weight is at least 1% by weight of the initial weight of the propylene polymer composition specimen, and gel permeation chromatography (GPC) at 145° C. in 1,2,4-trichlorobenzene is used to measure the molar mass distribution of all of the fractions to be taken into consideration, and the principal component A is formed by all of the fractions to be taken into consideration and which are eluted at above $(T_M/2)+7.5°$ C. and have an average molar mass $M_n$ (number average)$\geq$120,000 g/mol, the ancillary component B is formed by the fraction which is eluted at $(T_M/2)+7.5°$ C., and the ancillary component C is formed by all of the fractions to be taken into consideration and which are eluted at above $(T_M/2)+7.5°$ C. and have an average molar mass $M_n$ (number average)<120,000 g/mol, and where the room-temperature xylene-soluble fraction $X_L$ in the semicrystalline propylene polymer composition is not more than 5% by weight.

5. A semicrystalline propylene polymer composition as claimed in claim 4, where the room-temperature xylene-soluble fraction $X_L$ is not more than 3% by weight.

6. A film, a fiber or a molding comprising semicrystalline propylene polymer compositions as claimed in claim 1.

7. A biaxially stretched film made from the semicrystalline propylene polymer compositions as claimed in claim 1 and having a stretching ratio of at least 1:3 longitudinally and of at least 1:5 transversely.

8. A film, a fiber or a molding comprising semicrystalline propylene polymer compositions as claimed in claim 4.

9. A biaxially stretched film made from the semicrystalline propylene polymer compositions as claimed in claim 4 and having a stretching ratio of at least 1:3 longitudinally and of at least 1:5 transversely.

* * * * *